United States Patent

[11] 3,592,298

| [72] | Inventors | Charles B. Leffert<br>Troy;<br>Lawrence R. Hafstad, Bloomfield Hills,<br>both of, Mich. |
|---|---|---|
| [21] | Appl. No. | 838,583 |
| [22] | Filed | July 2, 1969 |
| [45] | Patented | July 13, 1971 |
| [73] | Assignee | General Motors Corporation<br>Detroit, Mich. |

[54] BRAKE HEAT PIPE COOLING
4 Claims, 6 Drawing Figs.

[52] U.S. Cl. .................................................. 188/71.6,
188/264 CC, 192/113 B
[51] Int. Cl. ............................................................. F16d 65/84
[50] Field of Search ............................................ 188/71.6,
264 CC, 264.2; 192/113.2; 165/105

[56] References Cited
UNITED STATES PATENTS

| 2,821,271 | 1/1958 | Sanford | 188/264 (.2) |
| 3,013,636 | 12/1961 | Dotto et al. | 188/264 CC UX |
| 3,208,559 | 9/1965 | Chambers et al. | 188/264 (CC) |
| 3,331,473 | 7/1967 | Hayes | 188/72.5 X |
| 3,481,439 | 12/1969 | Finkin | 188/264 (CC) X |

*Primary Examiner*—George E. A. Halvosa
*Attorneys*—W. E. Finken and D. D. McGraw ABSTRACT: A brake-cooling system in which the rotating brake friction surfaces are in heat transfer contact with the evaporator section of a heat pipe arrangement. The heat transferred during low levels of braking is transmitted to ambient air or other heat exchange means by conduction and convection. When sufficiently severe braking loads occur so that the conduction mode of heat transfer will not carry away the heat at a sufficient rate, the heat pipe liquid is vaporized and builds up vapor pressure to bring the heat pipe into efficient operation. As the cooling system quickly shifts into this mode of operation the entire heat pipe assembly in effect suddenly increases its thermal conductivity by several orders of magnitude and the heat is rapidly carried away to the heat pipe condenser section, where it is then removed by a suitable heat exchanger arrangement.

PATENTED JUL 13 1971
3,592,298
SHEET 1 OF 2
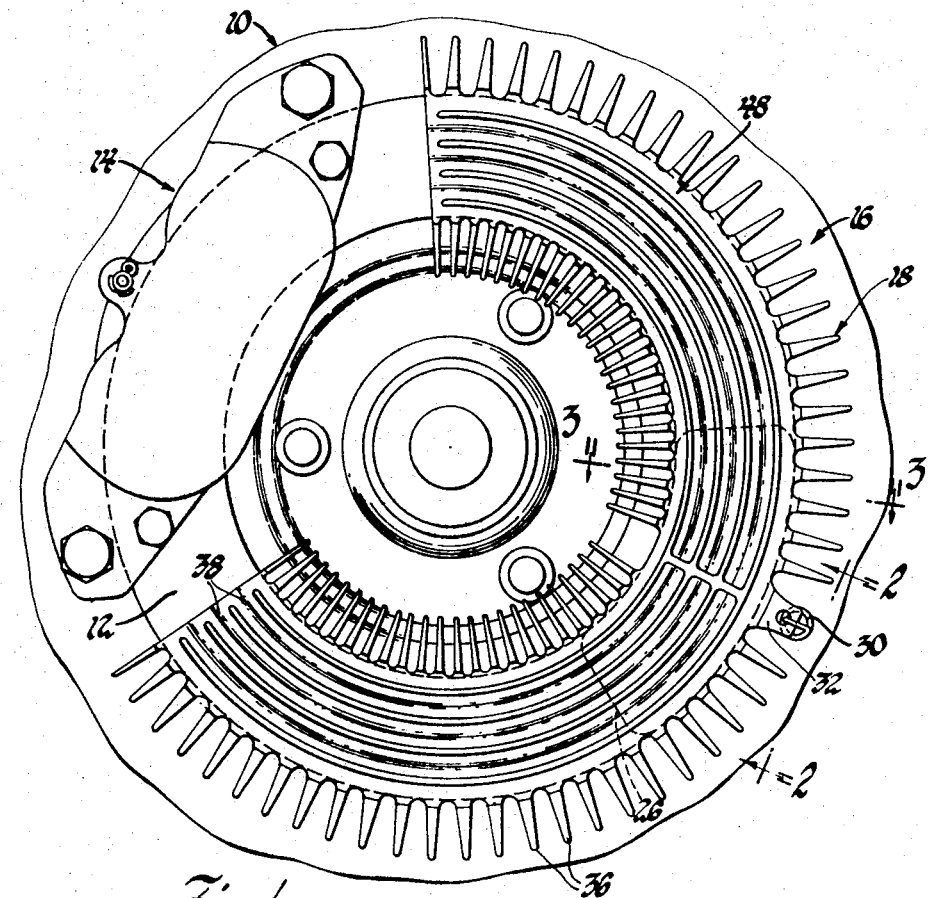
Fig.1
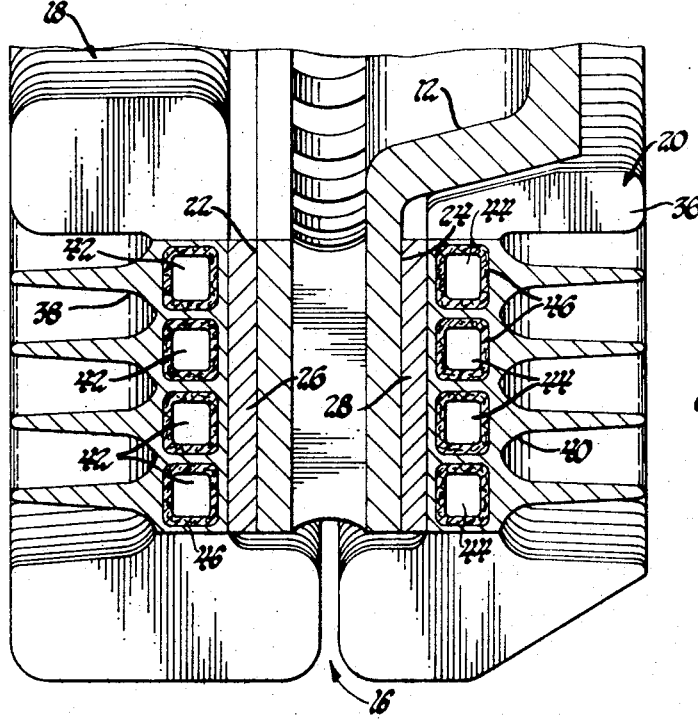
Fig.3
Fig.2
INVENTORS
Charles B. Leffert, &
BY Lawrence R. Hafstad
D. D. McGraw
ATTORNEY INVENTORS
Charles B. Leffert, &
BY Lawrence R. Hafstad D. D. McGraw
ATTORNEY

BRAKE HEAT PIPE COOLING

The invention relates to cooling automobile brakes utilizing friction to absorb kinetic energy by converting the energy to heat, and more particularly to an arrangement wherein the increased thermal conductivity of a heat pipe at heavy heat loads maintains the rate of heat removal at a sufficiently high level to dissipate the heat generated without adversely affecting the brakes.

In order to brake a vehicle such as an automobile or truck moving horizontally, the kinetic energy of the entire mass of the vehicle must be converted to heat. There is some energy conversion by aerodynamic drag on the vehicle, engine compression, fluid temperature in the transmission and rolling friction of the wheels relative to the road surface, for example. However, the primary mechanism of conversion of this energy to heat is the vehicle brake system. Heat generation rates vary greatly in vehicle brake systems and adequate provision must be made for the dissipation of high heat loads in a short period of time. The problem of removal of heat has been attacked by providing heat sinks, air cooling, and liquid cooling. In the invention now disclosed and claimed, the heat transport device referred to in the art as a "thermocon" or a "heat pipe" is utilized. The heat is removed from the interfacial sliding surfaces. When drum brakes are used, these surfaces include the brake drum and the brake shoes. The rotating disc of the typical production disc brake has similar surfaces. The disc is a fairly massive heat sink, is engaged at a relatively small arcuate portion of its annular braking surface by the brake pads, and has a major portion of the disc friction surfaces cooled by convection currents of air so that its average temperature increases rather slowly. The brake pad has little or no heat sink capability so that most of the heat generated at the interfacial surfaces passes directly into the disc.

Under rapid deceleration approaching 1 g., the typical automobile weighing about 3,600 pounds will transfer a power input into the discs which can heat the surface metal of the disc to high temperatures in the 1,000° F. range. Much of the heat in the disc is only temporarily stored in the surface layer of the metal, and as soon as the disc surface moves free of the brake pad the temperature gradient reverses near the disc surface and heat flows to the air until that part of the surface again engages the brake pad.

A device earlier known as the "thermocon," and now more commonly known as a "heat pipe," provides a more efficient transport of thermal energy than does ordinary conduction or convection. The device makes use of the high latent heat of vaporization of certain liquids and the high mass transport rates of the vapor phase to transport heat rapidly over appreciable distances with negligible temperature drops. The vapor is condensed, releasing the heat of vaporization, and returns by capillary action to the evaporator section of the heat pipe. A suitable wick material is provided to permit this operation. Heat pipes using various liquids such as ammonia, water, cesium, potassium, sodium and lithium, have been built to operate at temperatures from the cryogenic regions to 2,000°C.

For efficient operation, the vapor pressure in the heat pipe must be sufficient to carry the heat load, but must also be within the pressure limits of the tube wall. The vapor pressure of a liquid increases rapidly with temperature and with an excess of liquid available for vaporization in the tube, extreme pressures can be generated if the temperature of the entire pipe becomes too high. Because of these limitations, the temperature range for efficient operation of any particular heat pipe is limited to a small range about the boiling point of the liquid at atmospheric pressure. Since it is generally desirable to keep brake-lining temperatures at a level well below that at which brake fade may occur, it is desirable to use a heat pipe fluid with a boiling point near the desired brake-lining temperature-operating limit. This may be about 350°F., for example.

The prior art indicating the early development of the thermocon or heat pipe includes the following U.S. Pats. issued on the dates noted to Richard S. Gaugler: No. 2,350,347, issued June 6, 1944; No. 2,350,348, issued June 6, 1944; No. 2,422,401, issued June 17, 1947; No. 2,448,261, issued Aug. 31, 1948; No. 2,466,541, issued Apr. 5, 1949; No. 2,514,572, issued July 11, 1950; No. 2,517,654, issued Aug. 8, 1950; No. 2,565,220, issued Aug. 21, 1951; No. 2,565,221, issued Aug. 21, 1951, No. 2,583,769, issued Jan. 29, 1952 and No. 2,702,460, issued Feb. 22, 1955.

Numerous articles have also been published on various facets of the heat pipe and for the purpose of illustrating the state of the art reference is hereby made to the article entitled "The Heat Pipe" by G. Yale Eastman published in the May, 1968 issue of "Scientific American" beginning on pg. 38; and the article entitled "The Heat Pipe" published by Messrs. K. Thomas Feldman, Jr. and Glen H. Whiting in the Feb. 1967 issue of "Mechanical Engineering" beginning on pg. 30.

The invention involves a brake-cooling system in which the rotating brake friction surfaces of the rotatable member to be braked by a friction apply assembly has a brake-cooling arrangement including suitable heat-dispersing means, a heat-conducting member receiving heat from the disc or other member being braked, a heat pipe assembly in which the heat so received heats a liquid in the heat pipe and evaporates it, the vapor carrying the heat to a condenser section of the heat pipe where most of the heat is delivered to the heat-dispersing means, and the condensed liquid is then returned through the heat pipe to again be heated to a state of vaporization, until the heat transferred from the rotating member is at sufficiently low rate to no longer vaporize the heat pipe liquid.

IN THE DRAWINGS

FIG. 1 is an elevation view with parts broken away, illustrating a brake assembly embodying the invention.

FIG. 2 is a fragmentary elevation view of a portion of the mechanism of FIG. 1 taken in the direction of arrows 2–2 of that figure.

FIG. 3 is a cross section view with parts broken away and taken in the direction of arrows 3–3 of FIG. 1.

Figure 4:
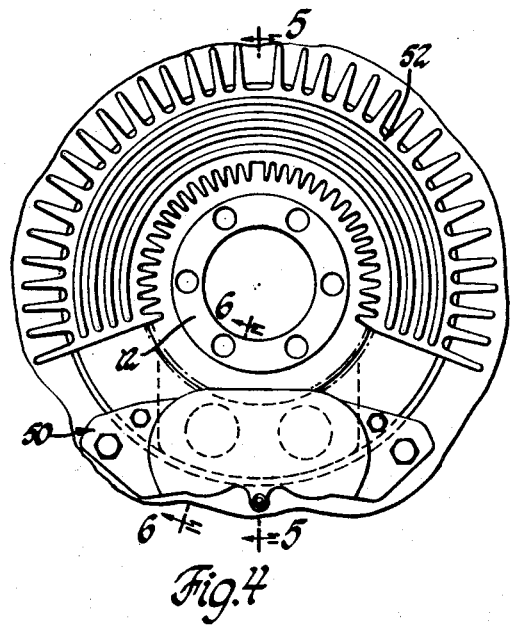
FIG. 4 is a view similar to FIG. 1, showing a modified arrangement.

The brake assembly 10 is illustrated as being for a vehicle wheel, and includes a disc 12 rotatable with the vehicle wheel, a brake caliper assembly 14 of any suitable type which will provide for friction braking of the disc 12, and a heat pipe arrangement 16. The heat pipe arrangement is suitably mounted about the major portions of the disc 12 not covered by the brake caliper assembly 14. The heat pipe arrangement includes an outer heat pipe assembly 18 and an inner heat pipe assembly 20. These assemblies are generally similar in construction, and the inner assembly will be mounted to a suitable support bracket which may also mount the brake caliper assembly 14. The outer heat pipe assembly 18 may be suitably secured to the inner heat pipe assembly 20.

Since heat is to be transferred from the friction braking surfaces 22 and 24 to the heat pipe assemblies by conduction, each heat pipe assembly is provided with a heat pipe cooling pad, 26 and 28 respectively. These pads are held into heat conduction engagement with the disc surfaces 22 and 24 by one or more springs such as spring 30, shown in FIG. 2 in detail. This spring is a tension spring with its ends connected to ears 32 and 34 respectively provided on the outer heat pipe assembly 18 and the inner heat pipe assembly 20.

The heat pipe assemblies are also provided with cooling fins 36. These fins extend outward axially, and also radially inward and outward, to provide suitable heat dispersing means so that the heat removed from the disc is exchanged and dissipated to the atmosphere. In some constructions other heat exchanger arrangements may be utilized, such as liquid-cooling heat exchangers.

The heat pipe assemblies have evaporator sections 38 and 40 adjacent the heat pipe cooling pads 26 and 28. The heat pipes include chambers or tubes formed in the portions of each pipe assembly. Thus, the outer heat pipe assembly 18 is illustrated as being provided with four tubelike chambers 42, and the inner heat pipe assembly 20 is illustrated as being provided with four tubelike chambers 44. Each chamber is closed and has a tubular formed wick 46 extending through the tubes or chambers so that each pipe portion of the heat pipe assembly has a tubelike chamber containing a tubelike wick engaging the chamber wall and defining a hollow center section. When heat is transferred to the heat pipe evaporator sections from disc 12 through cooling pads 26 and 28, some of the heat is delivered to the heat-dispersing cooling fins 36 by conduction. However, much of the heat is delivered to the heat pipe liquid contained in the pipe assemblies, and when the heat transferred is sufficient, the heat pipe liquid is vaporized and passes through the hollow center sections of each heat pipe to the heat pipe condenser sections 48, which are at the other ends of the heat pipes. In the condenser sections the vaporized liquid is cooled sufficiently to condense it, the heat of vaporization and other heat removed being transferred to the heat-dispersing cooling fins 36, and the condensed liquid returned to the evaporator sections through the wicks 46 by capillary action. Thus, the system makes use of ordinary conduction heat transfer for light braking loads and brings into operation the heat pipe under more severe braking loads when high heat extraction loads are required.

Figure 5:
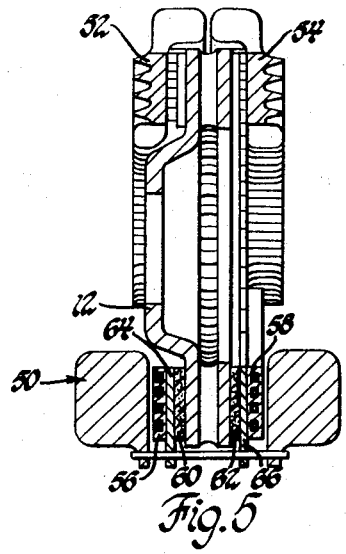
FIG. 5 is a cross section view of the modification of FIG. 4 and taken in the direction of arrows 5–5 of FIG. 4.
Figure 6:
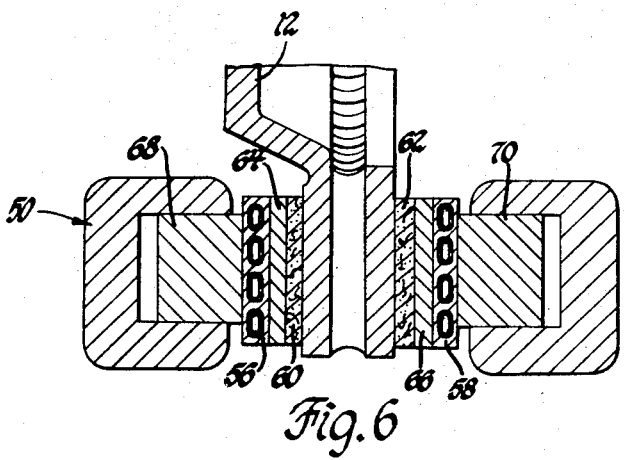
FIG. 6 is a cross section view taken in the direction of arrows 6–6 of FIG. 4, with parts broken away.

The modified construction shown in FIGS. 4 through 6 has the caliper assembly 50 positioned on the lower side of the disc 12 with the condenser sections 52 and 54 of the heat pipe assemblies being above the caliper assembly. The evaporator sections 56 and 58 are formed as a part of the caliper assembly 50 so that heat is transferred from the brake pads 60 and 62 through their respective braking plates 64 and 66 to the evaporator sections 56 and 58. Thus, in this modification, the heat pipe assemblies receive heat by conduction through the brake pads. This operates especially well with metallic pads. The evaporator sections are positioned intermediate the brake pads and the caliper pistons 68 and 70. This arrangement therefore has the added advantage of preventing overheating of the brake fluid which actuates the pistons.

What I Claim Is:
1. A brake assembly comprising:
a rotatable member to be braked and being a disc having opposed annular braking surfaces;
a brake apply assembly including means frictionally engaging said rotatable member for braking action;
and brake-cooling means including
heat-dispersing means
a heat-conducting member receiving heat from said rotatable member by conduction
a stationary heat pipe assembly having an evaporator section receiving heat from said heat conducting member,
a condenser section positioned above said evaporator section and receiving heat transported by heat pipe operation from said evaporator section,
said heat pipe assembly transferring heat to said heat-dispersing means by conduction and by heat pipe operation
and a pair of nonrotatable housings receiving said disc therebetween and each extending arcuately with the disc-braking surfaces from a low point at which said evaporator section is located to a higher point at which said condenser section is located, each of said housings having at least one heat pipe therein.

2. The brake assembly of claim 1,
said housings each having a heat transfer pad engaging a disc-braking surface in conductive heat transfer relation and positioned with said evaporator section for heat transfer thereto.

3. The brake assembly of claim 1,
said housings each extending arcuately to provide an annular configuration, said evaporator section being positioned in heat conductive relation with said frictionally engaging means of said brake apply assembly.

4. The brake assembly of claim 1,
said brake apply assembly including a caliper housing having piston means for actuating said frictionally engaging means and backing plate means for said frictionally engaging means,
said heat-conducting member including said frictionally engaging means and said backing plate means,
said evaporator section being in heat-conducting surface engagement with said backing plate means and transmitting caliper applied braking force therethrough from said caliper housing to said disc annular braking surfaces.